(12) United States Patent
Nickolaou

(10) Patent No.: US 8,306,672 B2
(45) Date of Patent: Nov. 6, 2012

(54) VEHICULAR TERRAIN DETECTION SYSTEM AND METHOD

(75) Inventor: James N. Nickolaou, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 494 days.

(21) Appl. No.: 12/556,396

(22) Filed: Sep. 9, 2009

(65) Prior Publication Data

US 2011/0060478 A1    Mar. 10, 2011

(51) Int. Cl.
*G01C 21/26* (2006.01)
(52) U.S. Cl. ............................................ 701/1; 348/135
(58) Field of Classification Search .............. 701/1, 400, 701/408, 409; 340/939, 600–605, 901, 903–905; 348/135, 148, 149, 169
See application file for complete search history.

(56) References Cited

U.S. PATENT DOCUMENTS

| | | | | |
|---|---|---|---|---|
| 6,300,865 | B1 * | 10/2001 | Fechner et al. | 340/436 |
| 6,807,473 | B1 * | 10/2004 | Tran | 701/80 |
| 7,176,830 | B2 * | 2/2007 | Horibe | 342/70 |
| 7,272,474 | B1 * | 9/2007 | Stentz et al. | 701/26 |
| 7,698,032 | B2 * | 4/2010 | Matsumoto et al. | 701/36 |
| 2011/0074955 | A1 * | 3/2011 | Kuehnle | 348/148 |

* cited by examiner

*Primary Examiner* — Dalena Tran
(74) *Attorney, Agent, or Firm* — Ingrassia Fisher & Lorenz, P.C.

(57) ABSTRACT

Methods and system are provided for detecting attributes of a terrain surrounding a vehicle. The system includes at least one terrain sensor configured to generate data describing the terrain and a processor coupled to the at least one terrain sensor. The processor is configured to detect at least one attribute of the terrain based on data generated by the at least one terrain sensor and to adjust a handling behavior of the vehicle based on the at least one terrain attribute.

20 Claims, 5 Drawing Sheets

VEHICULAR TERRAIN DETECTION SYSTEM AND METHOD

TECHNICAL FIELD

The present invention generally relates to vehicular sensing systems and, more particularly, relates to a vehicular terrain detection system and method.

BACKGROUND OF THE INVENTION

Increasingly, vehicles are being equipped with sensors that generate data describing the surrounding environment and terrain. For example, some vehicles include camera systems that provide images of the terrain and/or other objects in the vicinity of the vehicle. Further, automotive active safety sensors such as radars have been used to detect the presence, reflectance intensity, and positions of objects in the vehicle's path. The data generated by these sensors may be utilized by various vehicular systems to provide vehicle control, collision avoidance, adaptive cruise control, collision mitigation and other active safety features.

However, the performance of many sensors is adversely affected by certain road, weather, and other environmental conditions. For example, the performance of a vehicular camera system can be significantly degraded by conditions that affect outside visibility, such as sudden lighting changes (e.g., tunnel transitions) or inclement weather (e.g., fog, rain, snow, etc.). In addition, the performance of automotive radars can be degraded by road debris, inclement weather, and other signal interference that result in misclassification of a radar target or inaccurate position determinations.

Accordingly, it is desirable to provide a system that is able to detect the surrounding terrain in varying road, weather, and other environmental conditions. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment a system is provided for detecting attributes of a terrain surrounding a vehicle. The system includes at least one terrain configured to generate data describing the terrain and a processor coupled to the at least one terrain sensor. The processor is configured to detect at least one attribute of the terrain based on data generated by the at least one sensor and to adjust a handling behavior of the vehicle based on the at least one terrain attribute.

A method is provided for detecting attributes of a terrain surrounding a vehicle, the vehicle having a plurality of terrain sensors. The method includes receiving data describing the topography of a terrain from the plurality of terrain sensors, detecting the attributes of the terrain based on the received data, and adjusting a handing behavior of the vehicle based on the attributes of the terrain.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. It should also be understood that FIGS. 1-4 are merely illustrative and may not be drawn to scale.

Figure 1:
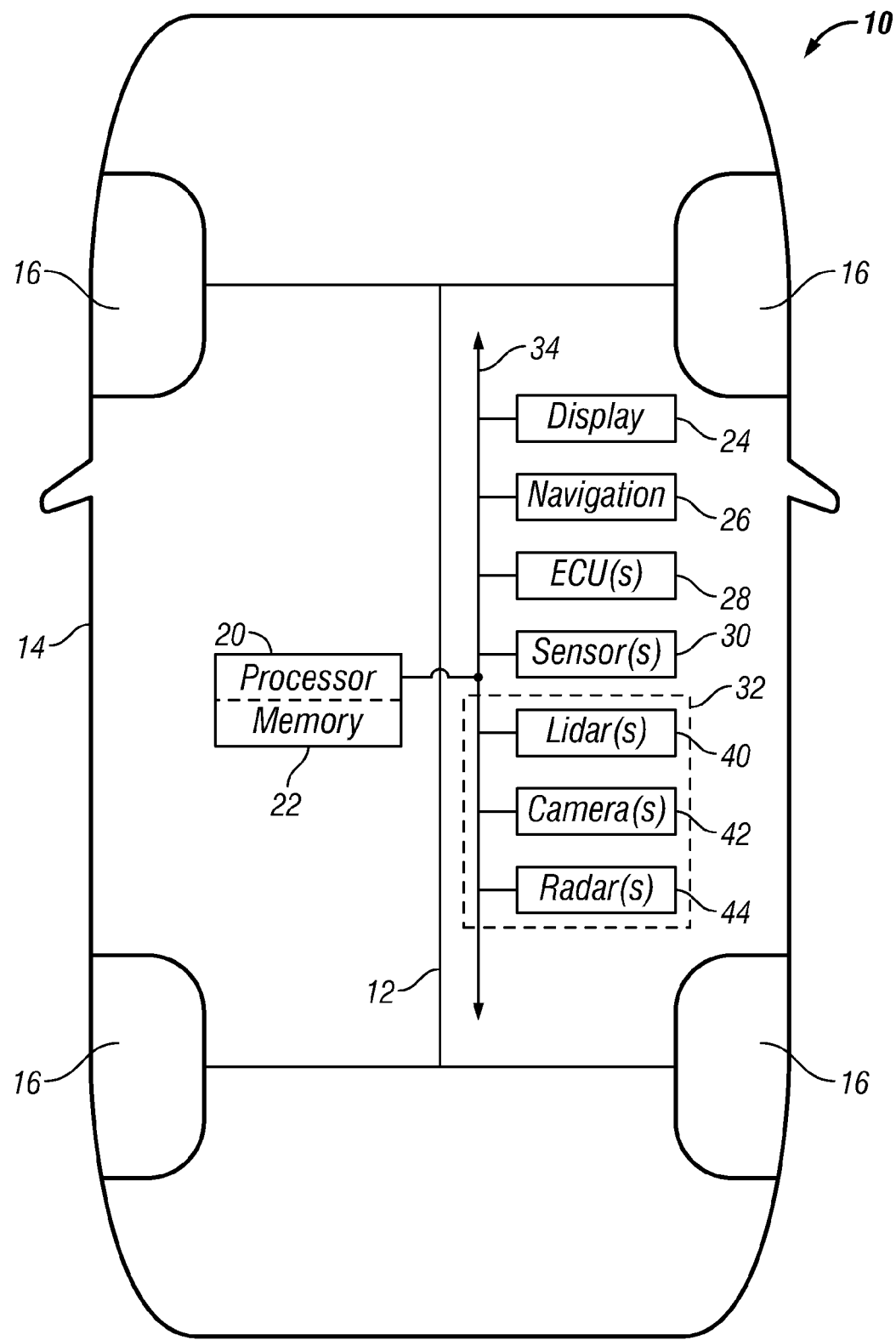
FIG. 1 is a block diagram of an exemplary vehicle according to one embodiment.

FIG. 1 is a block diagram of an exemplary vehicle 10 according to one embodiment. Vehicle 10 includes a chassis 12, a body 14, and four wheels 16. The body 14 is arranged on the chassis 12 and substantially encloses the other components of the vehicle 10. The body 14 and the chassis 12 may jointly form a frame. The wheels 16 are each rotationally coupled to the chassis 12 near a respective corner of the body 14.

The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), three-wheel drive (3WD), or all-wheel drive (AWD). The vehicle 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

Vehicle 10 further includes a processor 20, memory 22, a display device 24, a navigation system 26, electronic control units (ECUs) 28, sensors 30, and terrain sensors 32. As depicted, display device 24, navigation system 26, ECUs 28, sensors 30, and terrain sensors 32 are each coupled to processor 20 via a data communication link 34. In one embodiment, data communication link 34 comprises of one or more onboard data communication buses that transmit data, status and other information or signals between various components of vehicle 10. Onboard data communications buses 34 may include any suitable physical or logical means of connecting computer systems and components.

Processor 20 may include any type of processor or multiple processors, single integrated circuits such as a microprocessor, or any suitable number of integrated circuit devices and/or circuit boards working in cooperation to accomplish the functions of a processing unit. During operation, processor 20 executes one or more instructions preferably stored within memory 22.

Memory 22 can be any type of suitable memory, including various types of dynamic random access memory (DRAM) such as SDRAM, various types of static RAM (SRAM), and various types of non-volatile memory (PROM, EPROM, and flash). It should be understood that the memory 22 may be a single type of memory component or it may be composed of many different types of memory components. As noted above, memory 22 stores instructions for executing one or more methods including embodiments of the methods for determining when a task may be performed on a vehicle described below. In addition, memory 22 may be configured to store various other data as further described below.

Display device 24 renders various images (textual, graphic, or iconic) within a display area. In one embodiment, display device 24 includes a touch-screen display for rendering a user interface and other content in response to commands received from processor 20. However, display device 24 may be realized using other display types, such as a liquid crystal display (LCD), a thin film transistor (TFT) display, a plasma display, or a light emitting diode (LED) display.

Navigation system 26 generates data describing the current position of vehicle 10. In one embodiment, navigation system 26 includes a global positioning system (GPS) and/or one or more inertial measurement units (IMUs) for determining the current coordinates of vehicle 10 based on received GPS signals and/or dead reckoning techniques. The current coordinates of vehicle 10 may be utilized to identify the current location of vehicle 10 on a map that is stored in a map database.

ECU(s) 28 include one or more automotive control units for controlling the various systems of vehicle 10, such as a stability control unit, an engine control unit, a steering control unit, and a braking control unit, to name a few. Each ECU 28 includes one or more controllers, actuators, sensors, and/or other components that control the operation, handling, and other characteristics of vehicle 10. Sensor(s) 30 detect various attributes of the environment surrounding vehicle 10. In one embodiment, sensors 30 include a temperature sensor configured to determine the outside temperature and a rain detector configured to detect the accumulated rain on vehicle 10. It will be appreciated that alternative embodiments may include other types of sensors as well.

Terrain sensors 32 generate data describing the terrain and other objects within at least a portion of the area surrounding vehicle 10 (hereinafter, the "target area"). In the embodiments described herein, the target area includes a portion of the area in front of vehicle 10. However, it will be appreciated that the target area may comprise all or other portions of the area surrounding vehicle 10. In one embodiment, terrain sensors 32 include a plurality of dissimilar terrain sensing devices, such as one or more Light Detection and Ranging devices 40 (hereinafter, "LIDAR(s)"), camera(s) 42, and radar(s) 44. It should be noted that other terrain detecting devices (e.g., ultrasounds) may also be utilized.

Camera(s) 42 generate images of the target area, including images of a road, painted road markers (e.g., lane markers), other vehicles, and other objects within the target area. In one embodiment, camera(s) 42 comprise stereo cameras that generate images depicting the height/elevation and curvature of the surface of the target area. Radar(s) 44 utilize radio waves to sense the presence and position of objects within the target area.

LIDAR(s) 40 transmit light (e.g., ultraviolet, visible, and infrared) at the target area and some of this light is reflected/scattered back by the surface or other objects in the target area. This reflected light is received and analyzed to determine various attributes of the surface of the target area. For example, LIDAR(s) 40 may determine the range/position of the surface or other objects within the target area based on the time required for the transmitted light to be reflected back. In addition, LIDAR(s) 40 may detect the surface type and/or other properties of the surface based on the intensity of the reflected light.

Figure 2:
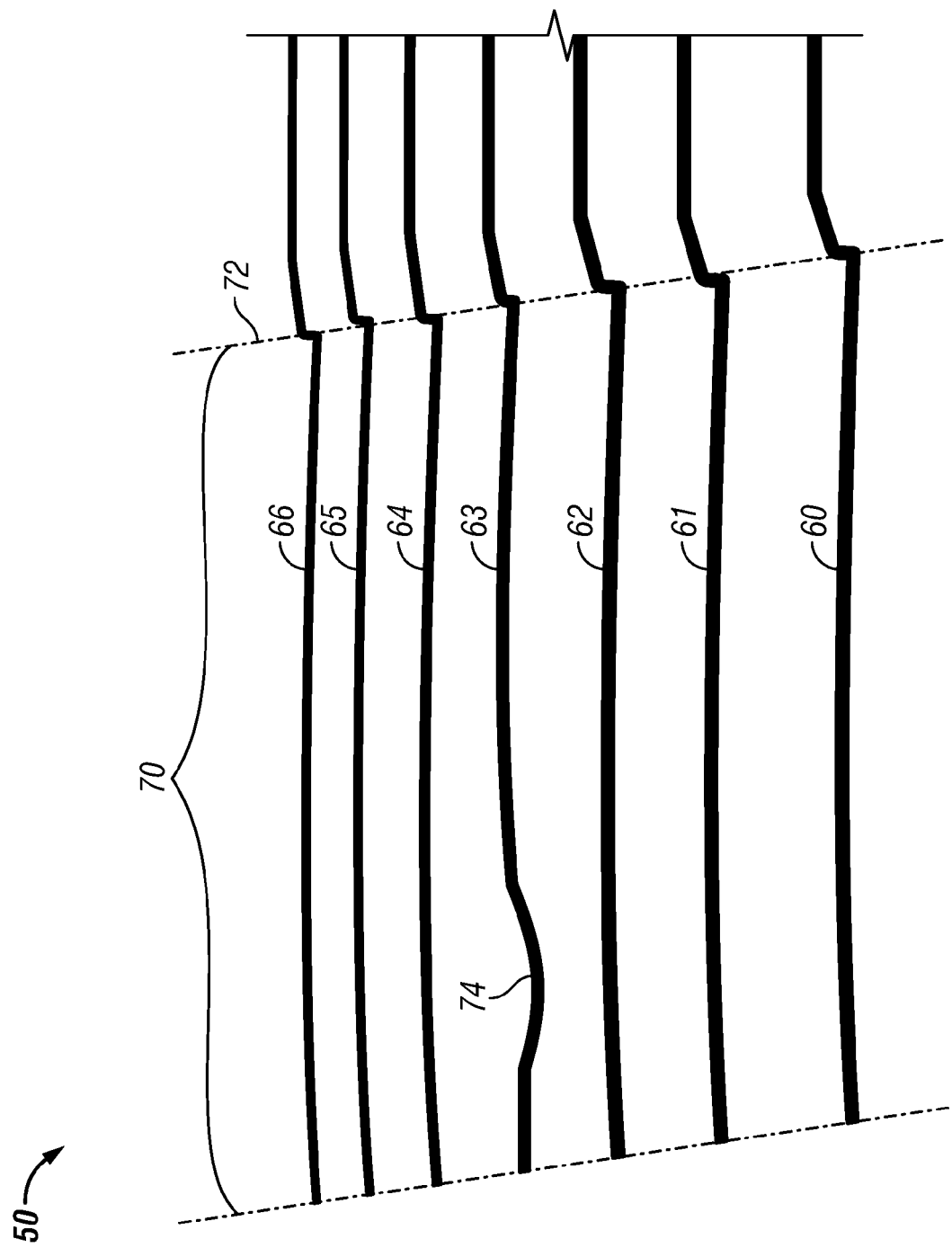
FIG. 2 depicts LIDAR data generated by one or more scanning LIDAR(s)

Referring now to FIG. 2, in one embodiment LIDAR(s) 40 (FIG. 1) include one or more scanning LIDAR(s) that generate data (hereinafter, "LIDAR data") 50 describing the topography and reflective properties (or reflectance intensity) of the surface of the target area. As depicted, LIDAR data 50 includes a plurality of concentric scan-lines 60, 61, 62, 63, 64, 65, 66 extending across the surface of the target area. Each scan-line corresponds to a different scan angle of scanning LIDAR(s) 40 and describes the topography and reflectance intensity of the corresponding positions on the surface of the target area. Depressions, steps, and other curvature within scan-lines 60-66 identify changes in the elevations of the corresponding positions on the surface of the target area. In addition, the reflectance intensity of the surface of the target area may be represented by the color or thickness of scan-lines 60-66 or by any other suitable method. Accordingly, LIDAR data 50 represents a snapshot of the surface of the target area.

With reference to FIGS. 1 and 2, processor 20 determines the shape/geometry of the surface of the target area based, at least in part, on LIDAR data 50. In one embodiment, processor 20 identifies substantially smooth/flat segments within scan-lines 60-66 that correspond to the position of a road 70 or other flat surface within the target area. Processor 20 then analyzes these substantially smooth/flat segments of scan-lines 60-66 to detect the shape and curvature of the detected road 70. Processor 20 may utilize a curve fitting technique and/or other suitable techniques to detect road 70 and determine its shape/geometry and curvature. Further, processor 20 may employ probabilistic duration and size estimates to distinguish road 70 from other substantially smooth/flat areas on the surface of the target area.

In addition, processor 20 identifies steps and/or curves within scan-lines 60-66 that correspond to positions of a road edge 72. For example, a consistent step within scan-lines 60-66 (or a substantial portion of scan-lines 60-66) positioned at the edge of a detected road may indicate the presence of a square edged curb 72. Alternatively, a smoother curve within scan-lines 60-66 (or a substantial portion of scan-lines 60-66) positioned at the edge of the detected road may indicate the position of a smoother road edge or curb.

Processor 20 may also detect obstacles, such as potholes or other vehicles within the detected road 70 based on depressions or other curvature within scan-lines 60-66. For example, processor 20 may identify depressions, mounds, or other variations in scan-lines 60-66 that correspond to the positions of potholes 74, speed bumps, and other variations in the elevation of the detected road 70. In addition, processor 20 may detect other obstacles, such as another vehicle, within the road 70 based, at least in part, on the curvature of scan-lines 60-66.

Further, processor 20 identifies the road type, road markings, road conditions, and other road surface features based, at least in part, on the reflectance intensity information within LIDAR data 50. In one embodiment, processor 20 identifies a road surface type (e.g., concrete, asphalt, pavement, gravel, grass, etc.) for the detected road 70 based on the reflectance intensity within the smooth/flat segments of scan-lines 60-66. Further, processor 20 may detect oil, standing-water, ice, snow, and other materials on the detected road 70 based on variations within the reflectance intensity. This information may be utilized to determine the condition (e.g., dry, wet, icy, oily, etc.) of the detected road 70.

In addition, processor 20 identifies lane markers, crosswalks, and other painted road markings based on variations in the reflectance intensity of the detected road 70. Processor 20 may determine the positions of one or more lanes within road 70 based on the positions of these detected lane-markers. In one embodiment, processor 20 utilizes the reflectance intensity information from LIDAR data 50 to identify tire tracks left by other vehicles in water, snow, slush or ice on the detected road 70. Such tire tracks are represented as missing, attenuated, or varying reflectance intensity within a detected lane position. Processor 20 may employ probabilistic duration and size estimates to distinguish between actual tire tracks and variations in the intensity information that are attributable to other causes (e.g., single sensor sample errors). The presence of such tire tracks may be utilized to determine the condition (e.g., wet, icy, or normal) or the detected road 70 and/or to identify the a vehicle type (e.g., car, truck, motorcycle, etc.) for the vehicle that is in front of vehicle 10.

Although the embodiments described above utilize one or more scanning LIDAR(s) to generate LIDAR data 50 and detect a topography and various attributes of the surface of the target area, it will be appreciated by one skilled in the art alternative embodiments may utilize LIDAR types, such as one or more flash LIDAR(s). A flash LIDAR utilizes a single diffuse light pulse to illuminate the target area and generates an instantaneous snapshot of the surface based on the reflected light. The data generated by the flash LIDAR(s) may then be analyzed to detect the topography and the reflectance intensity of the surface of the target area.

Figure 3:
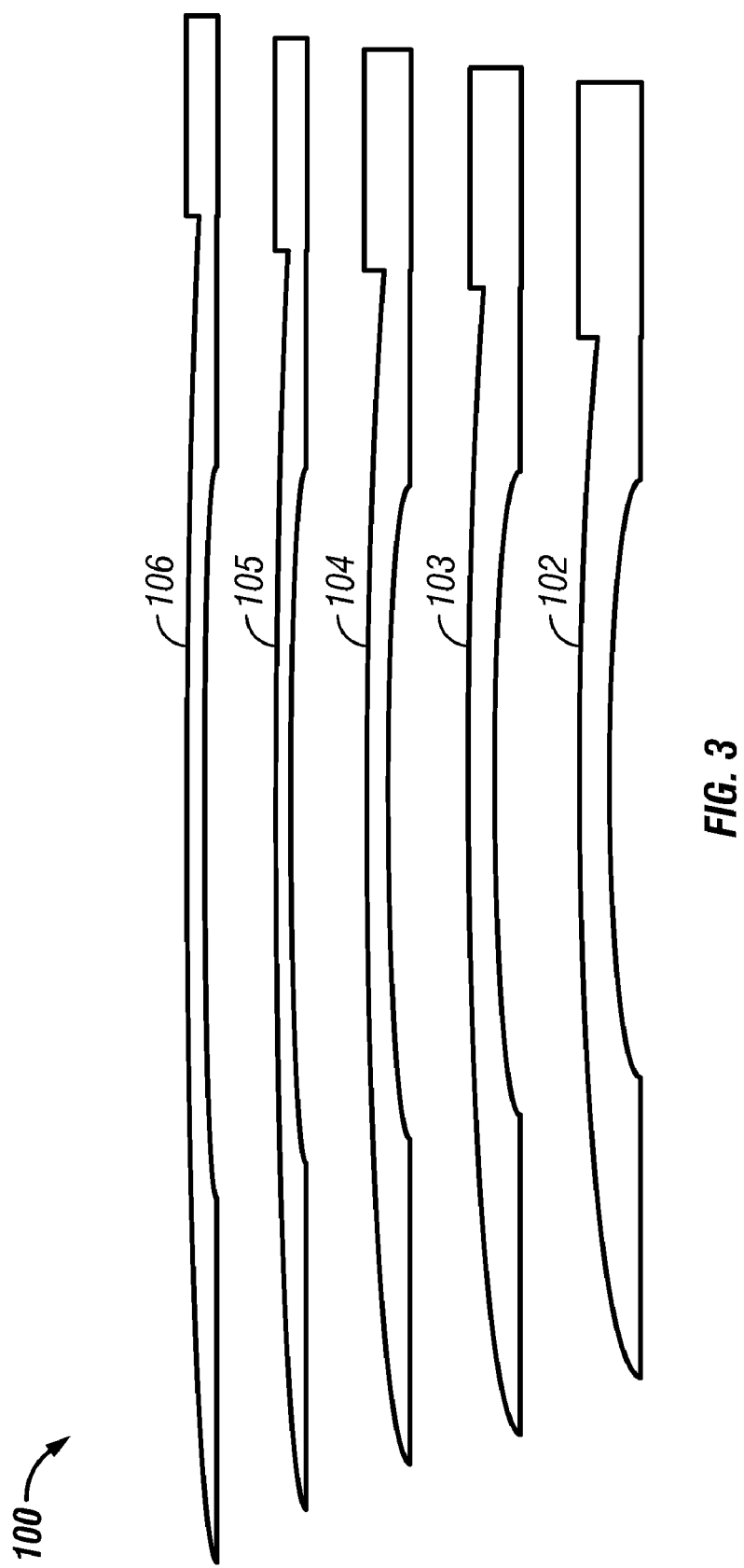
FIG. 3 depicts LIDAR data generated by one or more flash LIDAR(s)

Referring now to FIG. 3, in one embodiment the data 100 generated by the flash LIDAR(s) is segmented into a plurality of concentric range bins 102, 103, 104, 105, 106. Each range bin 102-106 describes the topography and the reflectance intensity of the corresponding positions on the surface of the target area. As with scan-lines 60-66 (FIG. 2), depressions, steps, and other curvature within range bins 102-106 identify similar changes in the elevation of the corresponding position on the surface of the target area. The reflectance intensity of the surface of the target area may be represented by the color or thickness of range bins 102-106 or by another suitable technique. With reference to FIGS. 1 and 3, it will be appreciated that processor 20 may determine the shape/geometry, curvature, curb and obstacle positions, surface type, road condition, painted road markings, tire track positions, and other attributes of a detected road utilizing methods that are substantially similar to the methods described above with regard to scan-lines 60-66 (FIG. 2).

Figure 4:
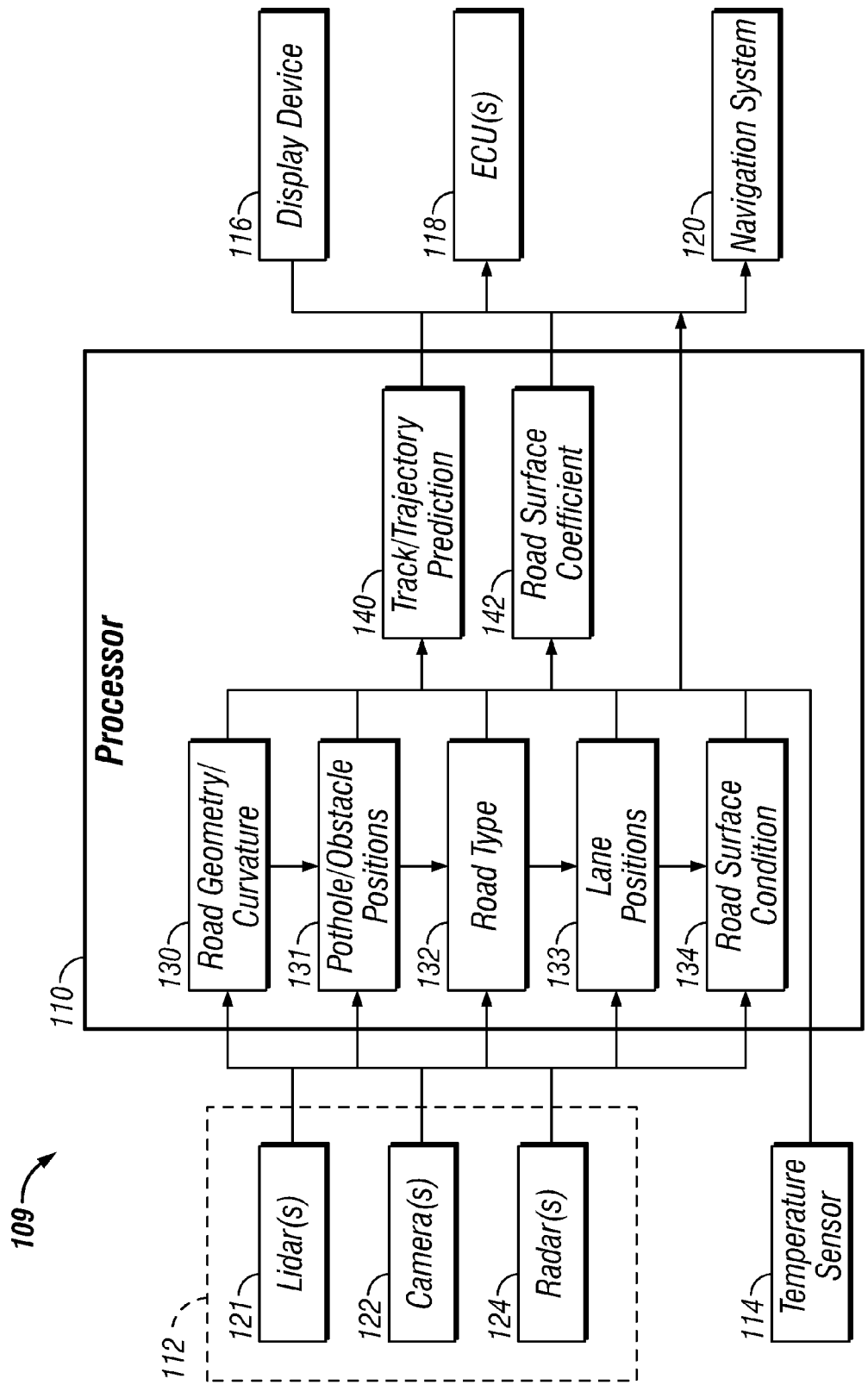
FIG. 4 is a block diagram of an exemplary terrain detection system for use within a vehicle.

FIG. 4 is a block diagram of an exemplary terrain detection system 109 for use within a vehicle. System 109 includes a processor 110, terrain sensors 112, a temperature sensor 114, a display device 116, one or more ECU(s) 118, and a navigation system 120. Terrain sensors 112 includes one or more dissimilar devices that generate data describing the topography of the terrain within a target area, such as LIDAR(s) 121, camera(s) 122, and radar(s) 124. Processor 110 detects various predetermined attributes (hereinafter, "terrain attributes") of the terrain, including a road shape/geometry and curvature 130, pothole/obstacle positions 131, a road type 132, lane positions 133, and a road surface condition 134.

As described above, processor 110 may detect the road geometry/curvature 130 based on data generated by LIDAR 121. In addition, processor 110 may utilize data from navigation system 120, camera(s) 122, and radar(s) 124 to detect the road geometry/curvature 130 with increased precision and/or speed. For example, processor 110 may analyze the images generated by camera(s) 122 and LIDAR(s) 121 to identify painted road markings (e.g., lane markers, solid lines, dashed lines, double lines, etc.), street signs, objects (e.g., other vehicles) and other visual indicia of the presence, shape/geometry, and curvature of a road.

Similarly, processor 110 may utilize the data from LIDAR(s) 121, camera(s) 122, and radar(s) 124 to detect the pothole/obstacle positions 131, a road surface type 132, lane positions 133, and a road surface condition 134 with increased precision and/or accuracy. Methods are provided above for detecting terrain attributes 131-134 based on LIDAR data 50 (FIG. 2). Processor 110 may also utilize the images of the road generated by camera(s) 122 and the position data generated by radar(s) 124 to detect the road type, potholes and other obstacles within the road, snow or ice on the road, as well as other attributes with increase precision and/or speed.

The use of dissimilar terrain sensors 112 (e.g., LIDAR(s) 121, camera(s) 122, and radar(s) 124) enables system 109 to accurately detect terrain attributes 130-134 under varying environmental conditions. For example, during inclement weather or other times when visibility is low such that the performance of camera(s) 122 is adversely affected, processor 110 may utilize the data generated by LIDAR(s) 121 and/or radar(s) 124 to detect terrain attributes 130-134. Further, processor 110 may utilize the data generated by LIDAR(s) 121 and/or camera(s) 122 when there is debris or other signal interference that degrades the performance of radar(s) 124.

Processor 110 generates data and command signals for display device 116, ECU(s) 118, and navigation system 120 based, at least in part, on the terrain attributes 130-134. In one embodiment, processor 110 utilizes attributes 130-134 to determine a desired track/trajectory for the vehicle and/or to predict the track/trajectory of a detected vehicle or other obstacle. This track/trajectory data 140, or command signals based thereon, is then transmitted to ECU(s) 118 to adjust the suspension, braking, steering, and/or other handling behavior of the vehicle. In addition, the track/trajectory data 140, or command signals based theron, may be utilized by navigation system 120 to determine the position of the vehicle or any detected vehicle or obstacle.

Processor 110 may also provide command signals to display device 116 and/or ECU(s) 118 based on attributes 130-134. For example, in one embodiment processor 110 provides command signals that cause display device 116 to display a warning when a pothole, speed-bump, other vehicle, or other obstacle is detected within the target area. In another embodiment, processor 110 provides command signals that cause the vehicle's steering system to be adjusted based on the presence of potholes, slush, ice, water, other vehicles, or other obstacles within a detected road. For example, processor 110 may transmit command signals to adjust the vehicle's position within a detected road in order to avoid detected obstacles. Processor 110 may also transmit command signals to adjust the braking, suspension, and/or other handling behavior of the vehicle based on a detected obstacle.

Figure 5:
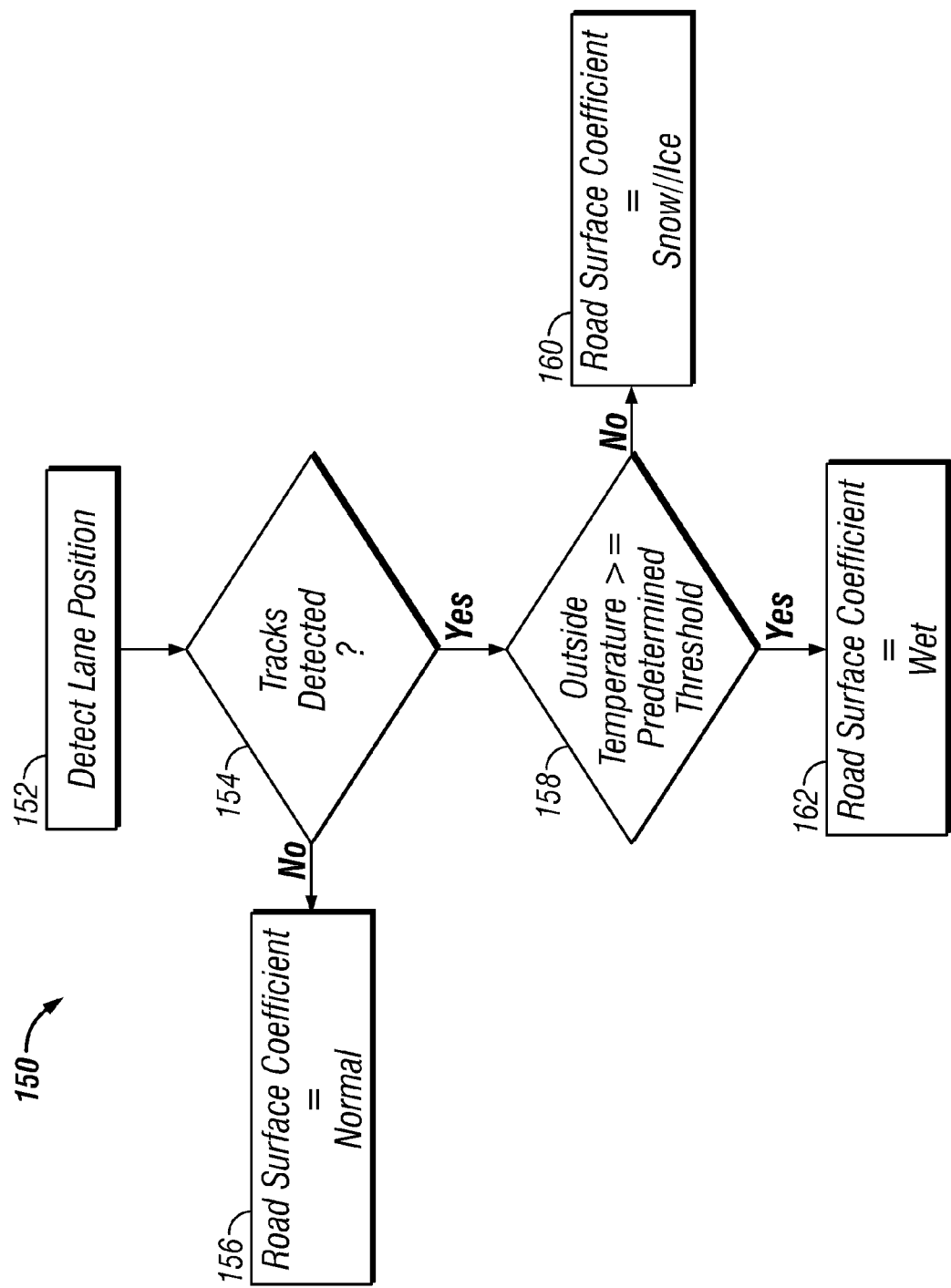
FIG. 5 is a flowchart of an exemplary method for determining a road surface coefficient.

In one embodiment, processor 110 determines a road surface coefficient 142 describing the road surface condition based on the presence of tire tracks within the detected road. FIG. 5 depicts a flowchart of an exemplary method 150 for determining a road surface coefficient 142. With reference to FIGS. 4 and 5, during step 152 lane positions within a detected road are determined. As described above, processor 110 may detect the lane position (e.g., lane positions 133) based on the data received from terrain sensors 112 (e.g., by detecting the positions of lane markers and other road markings). Alternatively, processor 110 may detect the presence and position of another vehicle on the detected road (e.g., based on the data generated by LIDAR(s) 121, camera(s) 122 or radar(s) 124) and then estimate the lane position based on the position of the detected vehicle.

Next, processor 110 determines if there are tire tracks within the detected lane position (step 154). As described above, processor 110 may detect the presence and position of tire tracks based on variations in the reflectance intensity information generated by LIDAR(s) 121. Processor 110 may also utilize data generated by the other terrain sensors 112 to detect tire tracks with increased precision and/or speed. For example, processor 110 may analyze images generated by camera(s) 122 to identify tire tracks within the detected lane position. If processor 110 is not able to detect any tire tracks, a value corresponding to normal road conditions is assigned to the road surface coefficient 142 (step 156).

Alternatively, if processor 110 identifies tire tracks within the detected lane during step 154, it then determines if the outside temperature is supportive of snow, slush, or icy road conditions (step 158). In one embodiment, processor 110 determines if the outside temperature is less than a predetermined temperature threshold based on data received from temperature sensor 114. In this case, the predetermined temperature threshold is calibrated to identify freezing or near freezing conditions outside the vehicle. If the outside temperature is less than the predetermined temperature threshold, the road surface coefficient 142 is assigned a value corresponding snowy or icy road conditions (step 160). Alternatively, the road surface coefficient 142 is assigned a value corresponding to wet road conditions (step 162). Other sensor data such as rain sensor data or windshield wiper state data could further corroborate the presence of wet road conditions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A terrain detection system for use within a vehicle, comprising:
   at least one terrain sensor configured to generate data describing a terrain surrounding the vehicle;
   a processor coupled to the at least one terrain sensor and configured to:
   identify a plurality of substantially flat segments within scan-lines of data corresponding to a road proximate the vehicle;
   detect at least one attribute of the terrain based on the data generated by the at least one terrain sensor via a curve-fitting technique applied to the plurality of substantially flat segments, the at least one attribute comprising a shape and curvature of the road; and
   adjust a behavior of the vehicle based on the shape and curvature of the road.

2. The terrain detection system of claim 1, wherein the at least one terrain sensor comprises a LIDAR configured to generate data describing variations in the topography of the terrain.

3. The terrain detection system of claim 2, wherein:
   the LIDAR is further configured to generate data describing a reflectance intensity of the terrain; and
   the processor is further configured to determine a road type based on the reflectance intensity of the terrain.

4. The terrain detection system of claim 2, wherein:
   the LIDAR is further configured to generate data describing a reflectance intensity of the terrain; and
   the processor is further configured to:
   detect variation in the reflectance intensity of the terrain that correspond to lane markers on the road based, at least in part, on the data generated by the LIDAR; and
   determine a lane position based on the lane markers.

5. The terrain detection system of claim 4, further comprising a temperature sensor coupled to the processor and configured to determine an outside temperature and wherein the processor is further configured to:
   identify variations in the reflectance intensity of the road that correspond to tire tracks within the lane position;
   determine if the outside temperature is less than a predetermined temperature threshold that is supportive of icy road conditions;
   determine that there is ice on the road if there are tire tracks within the lane position and the outside temperature is less than the predetermined temperature threshold; and
   determine that there is water on the road if there are tire tracks within the lane position and the outside temperature is not less than the predetermined temperature threshold.

6. The terrain detection system of claim 2, wherein:
   the LIDAR is further configured to generate data describing a reflectance intensity of the terrain; and
   the processor is further configured to detect water, ice, oil, and other materials on the road based, at least in part, on variations in the reflectance intensity of the terrain.

7. The terrain detection system of claim 2, wherein the at least one terrain sensor further comprises a camera coupled to the processor and configured to generate image data describing the terrain and wherein the processor is further configured to detect the at least one terrain attribute of the terrain based on the data generated by the camera and the LIDAR.

8. The terrain detection system of claim 1, wherein the processor is further configured to identify variations in the height of the terrain that correspond to the position of a road edge based, at least in part, on the data generated by the LIDAR.

9. The terrain detection system of claim 1, wherein the processor is further configured to detect variations in the height of the terrain that correspond to obstacles within the road based, at least in part, on the data generated by the LIDAR.

10. The terrain detection system of claim 9, wherein the obstacles comprise one or more potholes on the road.

11. The terrain detection system of claim 9, further comprising a display device coupled to the processor and wherein the processor is further configured to generate a warning on the display device when obstacles are detected on the road.

12. The terrain detection system of claim 1, wherein the processor is configured to adjust a steering system of the vehicle based on the shape and curvature of the road.

13. The terrain detection system of claim 1, wherein the processor is configured to adjust a braking system of the vehicle based on the shape and curvature of the road.

14. The terrain detection system of claim 1, wherein the processor is configured to adjust a suspension of the vehicle based on the shape and curvature of the road.

15. A method for detecting predetermined attributes of a terrain surrounding a vehicle, the vehicle having a plurality of terrain sensors and the method comprising:
   receiving data describing a topography of the terrain from the plurality of terrain sensors;

identifying a plurality of substantially flat segments within scan-lines of data corresponding to a road proximate the vehicle, via a processor;

detecting the predetermined attributes based on the received data via a curve-fitting technique applied to the plurality of substantially flat segments, the at least one attribute comprising a shape and curvature of the road, via a processor; and adjusting a behavior of the vehicle based on the shape and curvature of the road.

16. The method of claim 15, wherein the plurality of terrain sensors comprises a LIDAR configured to generate data describing variations in the topography and reflectance intensity of the terrain and the step of detecting further comprises:

analyzing the data generated by the LIDAR to detect:

substantially smooth portions of the terrain the correspond to a geometry of a road; and variations in a height of the terrain that correspond to a position of a road edge.

17. The method of claim 16, wherein the step of detecting further comprises analyzing the data generated by the LIDAR to detect variations in the height of the terrain that correspond to obstacles on the road.

18. The method of claim 16, wherein:

the step of receiving further comprises receiving data describing the topography and reflectance intensity of a terrain from the LIDAR; and the step of detecting further comprises:

analyzing the data generated by the LIDAR to detect variation in the reflectance intensity of the terrain that correspond to lane markers on the road based; and determining a lane position based on the lane markers.

19. The method of claim 18, wherein the vehicle further comprises a temperature sensor for determining an outside temperature and wherein the step of detecting further comprises:

identifying variations in the reflectance intensity of the road that correspond to tire tracks within the lane position;

determining if the outside temperature is less than a predetermined temperature threshold that is supportive of icy road conditions;

determining that there is ice on the road if there are tire tracks within the lane position and the outside temperature is less than the predetermined temperature threshold; and determining that there is water on the road if there are tire tracks within the lane position and the outside temperature is not less than the predetermined temperature threshold.

20. A terrain detection system for use within a vehicle, comprising:

a plurality of dissimilar terrain sensors configured to generate data describing a topography and a reflectance intensity of a terrain surrounding the vehicle;

a processor coupled to the plurality of dissimilar terrain sensors and configured to:

identify a plurality of substantially flat segments within scan-lines of data corresponding to a road proximate the vehicle;

detect at least one attribute of the terrain based on the data generated by the plurality of dissimilar terrain sensors via a curve-fitting technique applied to the plurality of substantially flat segments, the at least one attribute comprising a shape and curvature of the road; and adjust a handling behavior of the vehicle based on the shape and curvature of the road.

* * * * *